March 11, 1947.                G. L. LARISON                2,417,206
                          VEHICLE WHEEL SUSPENSION
                          Filed Nov. 30, 1943            4 Sheets-Sheet 1
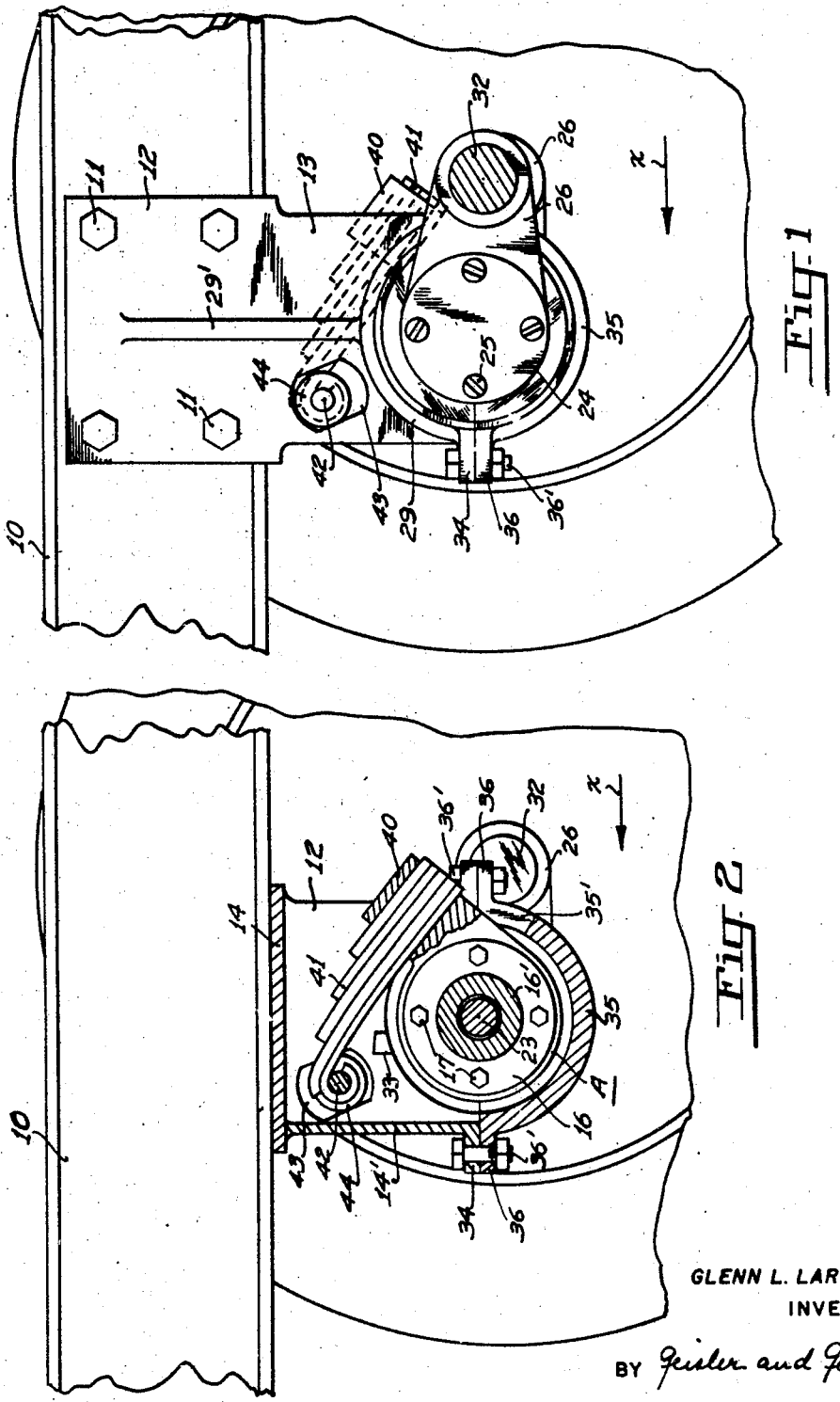
GLENN L. LARISON
INVENTOR
BY *Geisler and Geisler.*
ATTORNEYS March 11, 1947.　　G. L. LARISON　　2,417,206
VEHICLE WHEEL SUSPENSION
Filed Nov. 30, 1943　　4 Sheets-Sheet 2
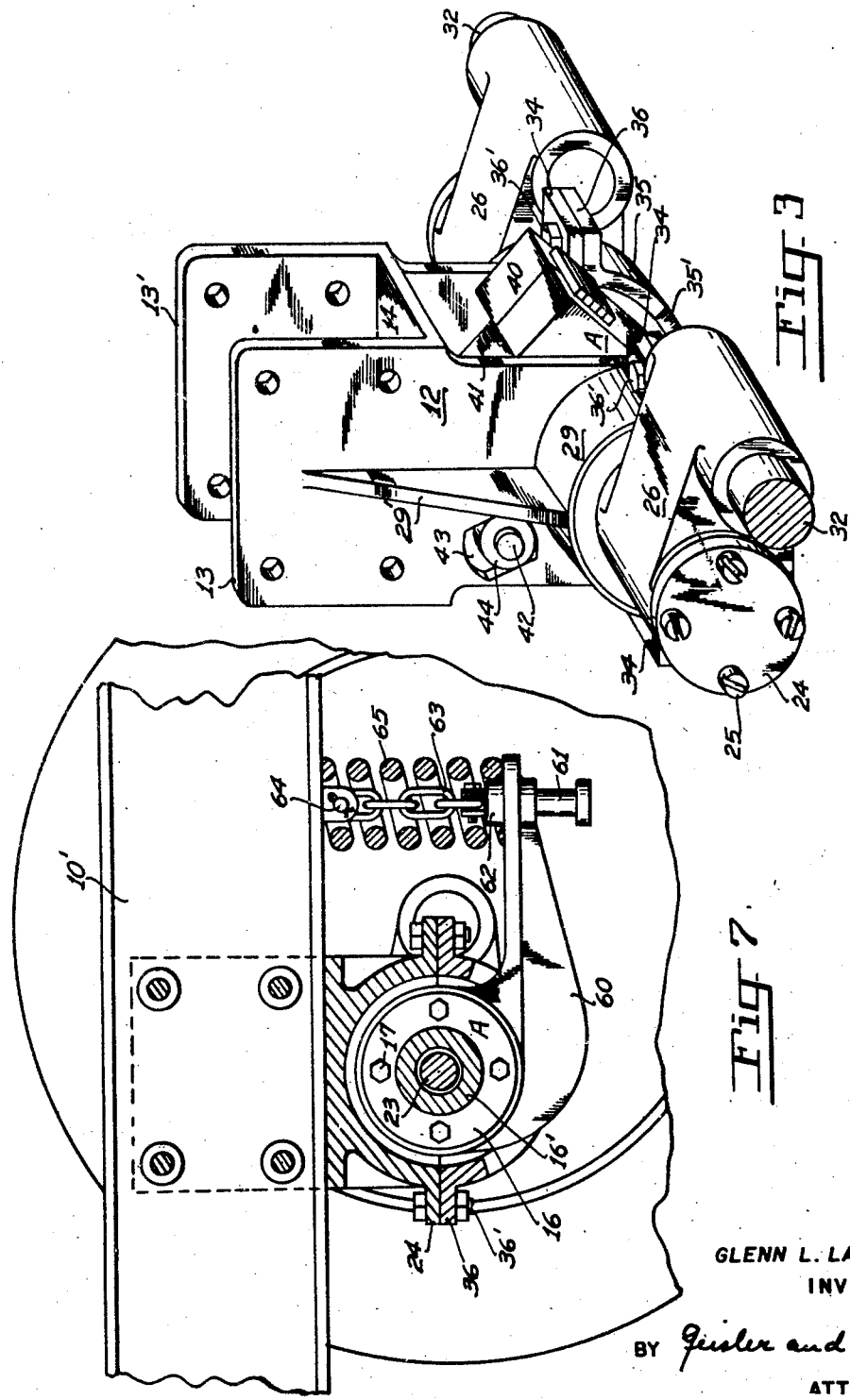
GLENN L. LARISON
INVENTOR
BY Geisler and Geisler
ATTORNEYS

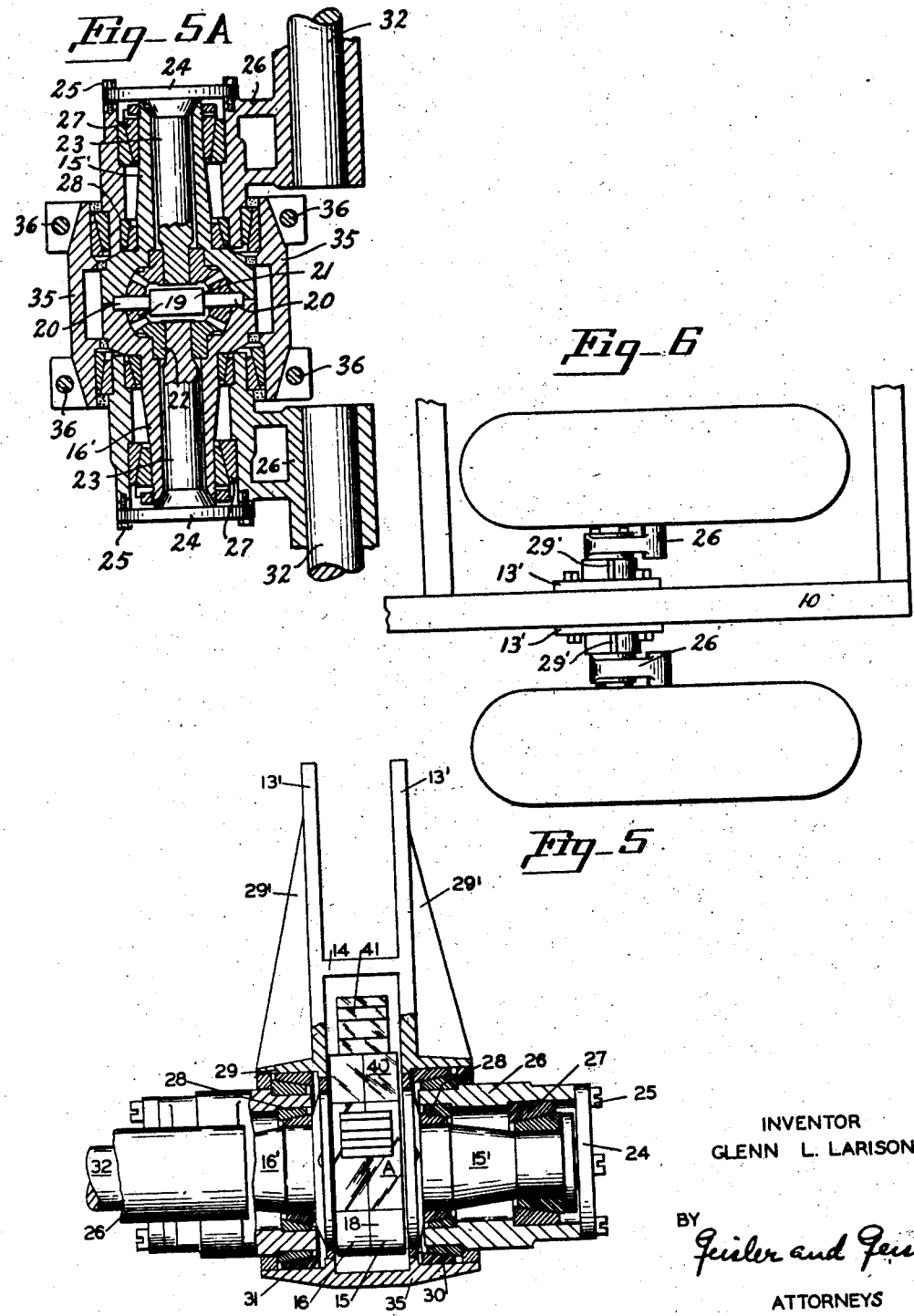

Patented Mar. 11, 1947

2,417,206

UNITED STATES PATENT OFFICE 2,417,206

VEHICLE WHEEL SUSPENSION

Glenn L. Larison, La Grande, Oreg., assignor to Larison Compensating Axle Corporation, a corporation of Oregon Application November 30, 1943, Serial No. 512,352

5 Claims. (Cl. 280—104)

This application is a continuation in part of my companion application, executed under the same date, entitled "Vehicle suspension," Serial No. 512,351, covering the same general subject matter and which has issued as Patent No. 2,401,766, June 11, 1946. Reference accordingly should be made to the companion application. The inventions in both applications relate to the mounting of vehicle wheels in pairs, with the wheel-spindles carried on arms arranged for up and down movement in parallel vertical planes, and with the wheel-spindle arms interconnected by compensating mechanism so that the load supported by the two wheels of the pair will be divided equally between them under all normal conditions.

The objects of the present invention are similar to those set forth in the companion application. In the structures involved in both inventions the compensating or differential mechanism and the hinged wheel-carrying assemblies are mounted on horizontal axes. In the particular species of the invention described in the present application the differential mechanism is carried by a rotatable supporting member on which the wheel-carrying assemblies are also supported. The wheel-carrying assemblies are connected respectively to the ends of the differential mechanism. Spring means are provided for controlling the rotational movement of the supporting member. Thus the wheel-carrying assemblies may move up and down in opposite directions, due to their connection with the differential mechanism or compensating means, or the wheel-carrying assemblies may both move up or down in the same direction causing rotational movement of the supporting member against the force of the spring means.

Referring to the accompanying drawings:

Fig. 1 is a fragmentary side elevation of one form of vehicle suspension embodying my invention, this figure illustrating my invention used with a single pair of wheels, the near-side wheel having been removed for the sake of clarity;

Fig. 2 is a sectional side elevation of the vehicle suspension of Fig. 1;

Fig. 3 is a view in perspective of the mounting bracket and wheel-carrying assemblies of Figs. 1 and 2 showing the mounting bracket removed from the vehicle frame and with the vehicle wheels removed;

Fig. 5 is an end elevation of the device shown in Fig. 3 with portions broken away to show the rotatable supporting means for the wheel-carrying assemblies;

Fig. 5—A is a fragmentary plan section of the device shown in Fig. 3 taken on the axis of rotation of the device;

Fig. 6 is a fragmentary plan view of a portion of the vehicle frame showing the pair of wheels and wheel-carrying assemblies mounted at one side of the vehicle, the top platform of the vehicle having been omitted for the sake of clarity.

Figure 8:
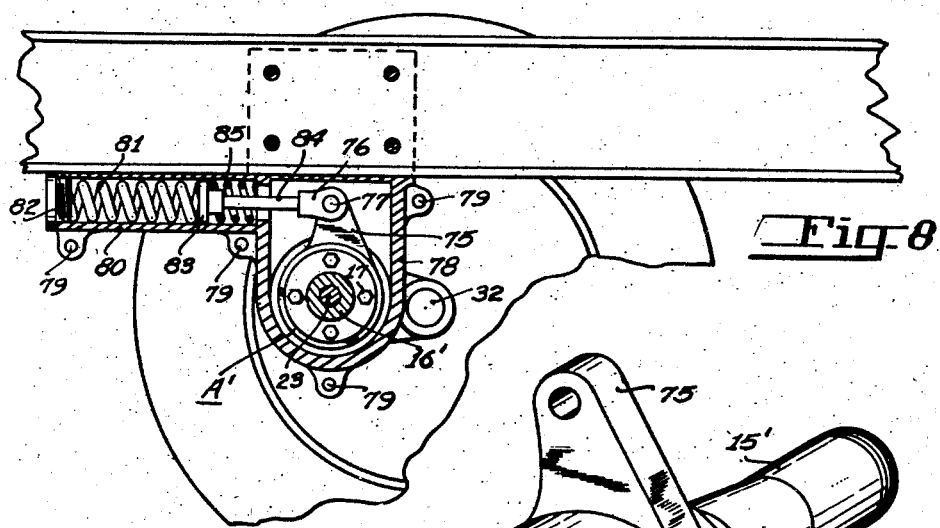
Figure 9:
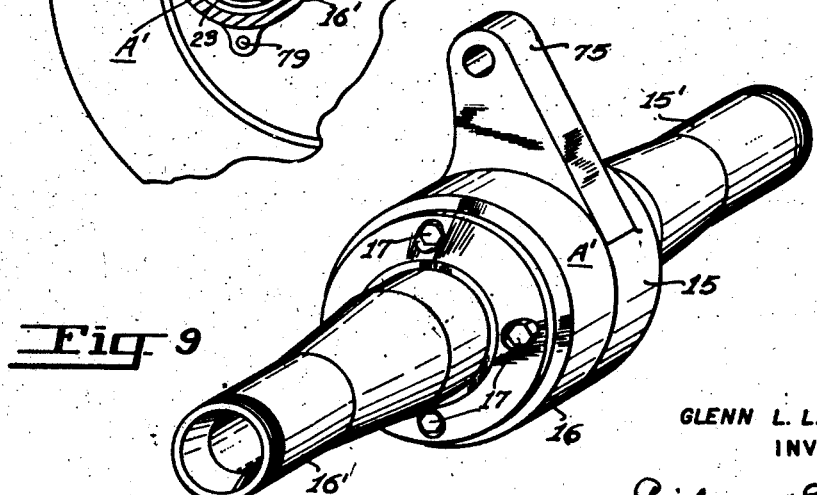

Fig. 7 is a sectional side elevation of a vehicle suspension embodying a single pair of wheels illustrating a slightly modified form of spring control for the rotatable supporting means;

Fig. 8 is a sectional side elevation of a further modified form of spring control for the rotatable supporting means, in which the spring and related members are entirely enclosed in a housing; and Fig. 9 is a view in perspective of the rotatable wheel supporting means of the modified form of my invention shown in Fig. 8, the rotatable wheel supporting means shown entirely removed from the housing bracket.

Referring first to Figs. 1, 2, 3 and 6 a suitable mounting bracket 12 is adapted to be secured to the vehicle frame 10, for example by means of bolts 11 or by welding. A suggested form for this mounting bracket is shown more clearly in Fig. 3, and the bracket illustrated includes a pair of side plates 13, 13', joined by an integral lateral cross plate 14, thus constituting an H-shaped frame adapted to straddle the side member 10 of the vehicle frame. Each side plate, 13, 13' terminates at the bottom in a semi-cylindrical, outwardly extending flange 29. The semi-cylindrical flanges 29 have horizontally extending ears 34 at their diametrically opposed ends to accommodate bolts 36'. The bracket is preferably further braced by the integral webs 29' at each side. An integral vertical wall 14' (see Fig. 2) also preferably extends between the side plates 13, 13' below the cross plate 14 primarily for the purpose of keeping the mud from splashing into this space.

A semi-cylindrical cap 35, extending across the bottom of the bracket to the outside edges of the flanges 29, and having the same internal diameter as the semi-cylindrical flanges 29, has a pair of corresponding ears 36 at each end through which the bolts 36' also extend, thereby securing the bottom cap 35 in place. A portion of the bottom cap 35 is cut away inside the bracket as indicated at 35' in Fig. 2, for a reason later explained.

A composite rotatable supporting member or means A (see Fig. 4), for the wheel assemblies is carried within the bracket 12 and comprises two identical sections 15 and 16 secured together by the bolts 17. (See also Fig. 2.) Each of these sections has an elongated hub 15' or 16' respectively, extending from the enlarged central portion 18. A wheel-spindle-carrying arm 26 is rotatably journalled on each elongated hub 15' or 16' by bearings 27 and 28. (See Fig. 5.) The spindle-carrying arms are also journalled within the cylindrical housing formed by the flanges 29 and the bottom cap 35 by means of bearings 30 and 31. A wheel spindle 32 is secured to each spindle-carrying arm 26. The composite rotatable supporting member A has a socket 40 on the exterior of the enlarged central portions 18 in which the end of a short leaf spring 41 is fixedly secured (see Figs. 2 and 4). The opposite end of leaf spring 41 is attached to a transversely extending pin 42. Rollers 44 are mounted on the outer ends of the pin 42 and are adapted to move in the axially alined slots 43 in the side plates 13, 13' of the bracket 12. The purpose of the spring 41, as apparent from Figs. 1, 2 and 3, is to control the rotational movement of the supporting member A.

Referring to Fig. 5—A, a differential mechanism is located on the inside of the rotatable supporting member. A plurality of differential pinions 19 are journalled on stub shafts 20 which are disposed about a central support 21 and secured between the sections of the rotatable member so that their positions are fixed. A pair of differential gears 22 mesh with the pinions 19 and are secured to shafts 23 which extend through the elongated hubs 15' and 16' of the rotatable supporting member. The outer ends of the shafts 23 terminate in enlarged circumferential flanges 24 with which the wheel-spindle-carrying arms 26 are connected by cap screws 25 or other suitable means.

A differential mechanism is located on the inside of the rotatable supporting member A.

The manner of operation of the device described will now be understood by referring to Figs. 1 to 6. If one of the two wheels of the pair is raised the other wheel will be lowered a corresponding amount, due to the differential or compensating mechanism connecting the two wheel carrying arms and located within the rotatable supporting member on which the wheel carrying arms are rotatably mounted. If both of the wheels are raised simultaneously (without raising the frame of the vehicle) the rotatable supporting member would have to be rotated slightly counter-clockwise against the force of the leaf spring 41. When the vehicle is travelling on the roadway and the two wheels suddenly encounter a bump causing them both to be raised, the spring 41 will tend to flex (depending of course upon the intensity of the resulting shock and the load of the vehicle), and this flexing of the spring will cushion the shock and reduce the effect on the vehicle of the sudden raising of the wheels. Similarly if only one of the wheels of the pair strikes the bump in the roadway the shock from the vehicle wheel will also be cushioned. Under such condition the composite mechanism will act in the usual manner to reduce by one half the lifting effect produced by the raising of one wheel, and the spring controlled rotatable supporting member will cushion the shock (if the shock is severe enough) and further reduce the effect on the vehicle. In Fig. 2 the vehicle is assumed to be moving along a smooth roadway in the direction indicated by the arrow X with both wheel spindles in transverse alinement and with the spring 41 in its natural position. In Fig. 1 it is assumed that the near side wheel of the vehicle (not shown) has hit a sudden small bump, which has not only caused the near side wheel (and thus the near side wheel-carrying arm 26) to be raised, but the shock of the bump has caused the rotatable supporting member to be rotated slightly counter-clockwise against the force of the spring 41, causing the spring to be straightened out and occupy the position shown by the broken lines. A suitable stop 33 (see Fig. 2) is preferably provided for the rotatable supporting member in order to limit its rotation and thus limit the upward movement of the wheel-carrying arms. This stop also limits the amount of strain to which the spring 41 can be subjected, and furthermore makes it possible for the vehicle to continue temporarily even if the spring 41 should become broken. The resiliency of the spring 41 should of course depend upon the normal load to be supported at that point in the vehicle and, if properly selected, no further spring mounting for the pair of vehicle wheels will be necessary. The cut-away portion 35' of the bottom cap 35 of the bracket 12 and the space between the side plates of the bracket enable the rotatable supporting member A to rotate to the extent permitted by the spring 41 and stop 33 without further interference.

Although I have shown leaf springs attached to the rotatable supporting member in my vehicle suspension, it is possible to substitute other spring means. In the modified construction shown in Fig. 7, a rigid arm 60 is secured to the rotatable supporting means in the mounting for a single pair of wheels. A coil spring 65 is interposed between the end of the arm 60 on the underside of the vehicle frame 10'. A headed plunger 61 is slidably disposed through a boss 62 on the end of the arm 60 and is secured to a chain 63, the upper end of which chain is attached to the vehicle frame member at 64. The chain and plunger connection permits limited free movement of the arm 60 with the flexing of the spring. However, if the vehicle is lifted above the ground, the chain acts to prevent the wheel-carrying arms from dropping all the way down.

Figure 4:
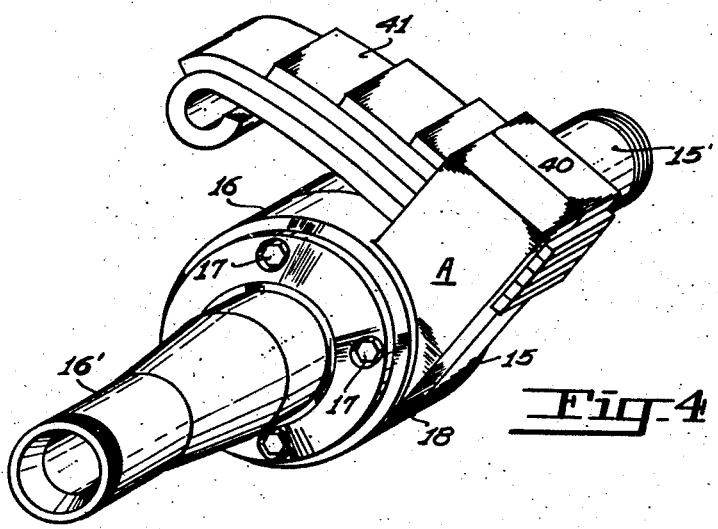
Fig. 4 is a view in perspective of the rotatable supporting means shown removed from the mounting bracket.

In the modified form of vehicle suspension shown in Fig. 8 the rotatable supporting member A' is similar to the rotatable supporting member A of Fig. 4 except that a rigid arm 75 (see also Fig. 9) extends from one section (15) of the rotatable supporting member and is adapted to engage a link end 76 to which it is connected by means of a pin 77. The housing bracket 78 differs from that shown in Figs. 1, 2 and 3 in that it is split longitudinally, the two halves being secured together by bolts 79. The housing bracket includes a cylinder 80, the half sections of which are preferably formed integral with the sections of the main portion of the housing bracket 78. A compression spring 81 is disposed within the cylinder 80 and is retained therein by a removable cylinder head 82. The inner end of the compression spring 81 is engaged by a piston 83 attached to a rod 84. The rod 84 in turn is attached to the link end 76. A lighter and shorter recoil-cushioning spring 85 is placed between the piston 83 and a shoulder at the inner end of the cylinder 80.

This modified construction, illustrated in Fig. 8, in addition to employing a coil spring in place of the leaf spring of Figs. 1 and 2, enables the spring and associated members to be entirely enclosed in the sealed housing thus completely protecting the same from dirt and grit and simplifying the problem of lubrication since the housing can be filled with oil.

The rotatable supporting member or means, which is an essential part of the present invention, may be formed in slightly modified shapes and mounted for rotation in various ways within the supporting bracket or housing.

I claim:

1. In a vehicle running gear assembly, a supporting member mounted at one side of the vehicle for rotational movement on a horizontal axis and extending transversely with respect to the vehicle, a pair of wheel-spindle assemblies rotatably mounted on said supporting member and pivoting on the same axis as said supporting member, compensating mechanism carried by said supporting member and connected to said supporting member, each of said wheel-spindle assemblies connected to said compensating mechanism, said compensating mechanism so constructed and arranged that upward movement of one wheel-spindle assembly will cause relative opposite movement of the other wheel-spindle assembly, but said compensating mechanism so connected with said supporting member that movement of both assemblies in the same direction will cause said supporting member to be rotated with said assemblies, and resilient means controlling the rotation of said supporting member.

2. In a mounting for a pair of vehicle wheels, a supporting means mounted for rotational movement on a horizontal axis, a pair of wheel-spindle assemblies rotatably mounted on said supporting means and pivoting on the same axis as said supporting means, differential mechanism carried by said supporting means and connected with said supporting means, each of said wheel-spindle assemblies connected to said differential mechanism, said differential mechanism so constructed and arranged that upward movement of one wheel-spindle assembly will cause relative opposite movement of the other wheel-spindle assembly, but said differential mechanism so connected with said supporting means that movement of both assemblies in the same direction will cause said supporting means to be rotated with said assemblies, and means attached to said supporting means controlling the rotation of said supporting means.

3. In a vehicle suspension, a supporting member mounted at one side of the vehicle for rotational movement on a horizontal axis and extending transversely with respect to the vehicle, a pair of wheel-spindle assemblies rotatably mounted on the ends of said supporting member respectively and pivoting on the same axis as said supporting member, differential mechanism carried within said supporting member and connected to said supporting member, each of said wheel-spindle assemblies connected to said differential mechanism, said differential mechanism so constructed and arranged that upward movement of one wheel-spindle assembly will cause relative opposite movement of the other wheel-spindle assembly, but said differential mechanism so connected with said supporting member that movement of both assemblies in the same direction will cause said supporting member to be rotated with said assemblies, and a resilient element attached to said supporting member controlling the rotation of said supporting member and acting to cushion the shocks to the vehicle transmitted through said assemblies and said differential.

4. In a mounting for a pair of vehicle wheels, a bracket, said bracket attached to the vehicle frame, a supporting member carried in said bracket and mounted for rotational movement on a horizontal axis, a pair of wheel-spindle assemblies rotatably mounted on said supporting member, differential mechanism carried within said supporting member and connected to said supporting member, each of said wheel-spindle assemblies connected to said differential mechanism, said differential mechanism so constructed and arranged that upward movement of one wheel-spindle assembly will cause relative opposite movement of the other wheel-spindle assembly, but said differential mechanism so connected with said supporting member that movement of both assemblies in the same direction will cause said supporting member to be rotated with said assemblies, and a spring attached to said supporting member and to said bracket controlling the rotation of said supporting member and acting to cushion the shocks to the vehicle transmitted through said assemblies and said differential.

5. A mounting for a pair of vehicle wheel comprising, a supporting member mounted at one side of the vehicle for rotational movement on a horizontal axis and extending transversely with respect to the vehicle, a pair of wheel-spindle assemblies rotatably mounted on the ends of said supporting member respectively and pivoting on the same axis as said supporting member, compensating mechanism carried within said supporting member and connected to said supporting member, each of said wheel-spindle assemblies connected to said compensating mechanism, said compensating mechanism so constructed and arranged that upward movement of one wheel-spindle assembly will cause relative opposite movement of the other wheel-spindle assembly, but said compensating mechanism so connected with said supporting member that movement of both assemblies in the same direction will cause said supporting member to be rotated with said assemblies, and resilient means attached to said supporting member and to the vehicle frame controlling the rotation of said supporting member and acting to cushion the shocks to the vehicle transmitted through said assemblies and said compensating mechanism.

GLENN L. LARISON.

REFERENCES CITED

The following references are of record in the file of this patent:

UNITED STATES PATENTS

| Number | Name | Date |
| --- | --- | --- |
| 2,236,734 | Ronning | Apr. 1, 1941 |
| 2,286,576 | Ronning | June 16, 1942 |
| 2,206,359 | Larison | July 2, 1940 |
| 2,284,665 | Larison | June 2, 1942 |
| 1,894,776 | Liang | Jan. 17, 1933 |
| 2,013,994 | Schutte | Sept. 10, 1935 |

FOREIGN PATENTS

| Number | Country | Date |
| --- | --- | --- |
| 608,558 | French | Apr. 24, 1926 |